United States Patent [19]
Weinberg

[11] Patent Number: 5,721,397
[45] Date of Patent: Feb. 24, 1998

[54] ELECTRICAL INSULATION AND PRODUCTS PROTECTED THEREBY

[76] Inventor: Martin J. Weinberg, 167 Fairview Ave., Stamford, Conn. 06902

[21] Appl. No.: 475,895

[22] Filed: Jun. 7, 1995

[51] Int. Cl.$^6$ ............................................. H01B 7/00
[52] U.S. Cl. ........................ 174/110 SR; 174/110 N; 174/110 V; 174/110 PM
[58] Field of Search ........................ 174/110 R, 110 N, 174/110 V, 108, 110 SR, 110 PM

[56] References Cited

U.S. PATENT DOCUMENTS

| | | | |
|---|---|---|---|
| 3,413,405 | 11/1968 | Myers | 174/36 |
| 3,657,008 | 4/1972 | Gleim | 117/218 |
| 3,742,596 | 7/1973 | Smith et al. | 29/596 |
| 4,658,492 | 4/1987 | Kieffer et al. | 29/564.6 |
| 5,010,165 | 4/1991 | Pruett et al. | 528/272 |
| 5,105,057 | 4/1992 | Weinberg | 174/121 R |
| 5,153,302 | 10/1992 | Masuda et al. | 528/272 |
| 5,218,170 | 6/1993 | Ferlier et al. | 174/110 SR |

*Primary Examiner*—Kristine L. Kincaid
*Assistant Examiner*—Marc D. Machtinger
*Attorney, Agent, or Firm*—William W. Jones

[57] ABSTRACT

A flexible, tough electrical insulation is described for use in electric motors, generators, hermetic motors, transformers, and other electrical devices. The insulation described herein includes a layer of a cyclohexylene dimethylene terephthalate polymer (PCT), or one or more copolymers thereof. The PCT layer can be used in a film or in a nonwoven mat form, by itself, or alternatively, as a component of a laminate. The insulation can take the form of an insulating tape, an insulating sheet, an electric motor slot liner, motor wedges, or as some other die-cut insulating component. The insulation and products protected by the insulation can be used in a broad range of service application temperatures.

7 Claims, 2 Drawing Sheets

ELECTRICAL INSULATION AND PRODUCTS PROTECTED THEREBY

TECHNICAL FIELD

This invention relates to an electrical insulating material; to electrical components which include the insulation material; and to methods for forming such components. More particularly, this invention relates to an electrical insulating material for insulating components of electromagnetic induction electrical equipment, which insulating material includes a cyclohexylene dimethyl terephthalate polymer (PCT), or one or more copolymers thereof.

BACKGROUND ART

In the manufacture of electric motors, generators, hermetic motors, transformers, and other electrical devices, it is necessary to use some form of dielectric insulation to separate the internal components thereof. Products which are used as electrical insulation in rotating electrical equipment, such as slot liners, phase insulation, wedge stock, and the like, typically range from 0.005 inch to 0.030 inch in thickness. These insulation products are typically produced in continuous stock rolls which are converted into slit tapes, cut sheets, die cut parts, or the like, as required by the end use. Conductor wire insulation is typically 0.001 to 0.005 inch thick.

In thermal class F insulations, which are UL recognized for service operating temperatures of up to 155° C., the most widely used non-wire insulation (by "non-wire" is meant an insulation application which does not involve wrapping the insulation material about a conductor wire) is known as "DMD", and is a laminate formed from non-woven polyester fiber mat components sold under the trademark "Dacron", which are bonded to opposite sides of a core polyethylene terephthalate (PET) polyester film sold under the trademark "Mylar", thus the name "DMD" for the laminate. DMD type electrical insulations are sold by Acme Division of Allied Products Corp. under the trademark "Acuflex"; and are sold by Westinghouse Electric under the trademarks "Memco" and "Pyrolam 100".

The process used to manufacture the DMD laminate is complex, time-consuming, and involves the use of environmentally hazardous materials. The manufacture of DMD involves first, the adhesive bonding of both polyester non-woven mat components to the polyester film component. Then the polyester non-woven mat surfaces are saturated or overcoated with a hard resin, usually polyester or epoxy to try to tie down the surface fibers and create a smooth abrasion-resistant surface. The resin also acts as a protective coating on the polyester film to retard oxidation and hydrolytic attack. As noted above, production of the DMD insulation laminate is time-consuming, and involves the use of materials which are potential environmental pollutants, such as the mat-saturating resins, and the adhesives used to produce the laminate. The DMD laminate may also tend to gradually and progressively de-laminate while in service, if flexed improperly, or if the adhesive bond is defective. This delamination of DMD may be exacerbated by recurring temperature fluctuations, accompanied by ambient moisture which results in freezing and thawing cycles thereby deteriorating the DMD laminate because the latter contains components having different thermal expansion coefficients.

For lower service temperature applications, such as service operating temperatures of up to 130° C. thermal class, films of polyethylene terephthalate (PET), and laminates other than DMD which include PET have been UL recognized, and are widely used as conductor insulating tapes as well as slot liner and phase insulation in motors; and ground, barrier and layer insulation in dry transformers.

It would be desirable to have a single component electrical insulation material which would provide the necessary dielectric protection, and the chemical and thermal stability for environments encountered in motors, generators, transformers, and in other electrical devices which operate over a broad range of insulation service temperatures, which encompasses both DMD non-wire applications and the PET and other insulation wire applications.

DISCLOSURE OF THE INVENTION

This invention relates to an electrical insulation material which can be formed in stock rolls, and which material can be produced in the full range of insulation thicknesses. The electrical insulation material of this invention includes at least one layer formed from a polymer of polycyclohexylene dimethylene terephthalate (PCT), or copolymers thereof. A PCT extruded film or non-woven PCT fiber mat can be used in place of PET films and other insulations in wire wrap applications; in place of the DMD laminate non-wire insulation applications; and, in still higher temperature applications, as a component of an insulation laminate.

When used in the film form, the PCT film is preferably formed in the amorphous state, and remains in the amorphous state until it has been applied to the electrical components which it insulates. Compared to PET electrical insulation films, PCT-based films possess a higher crystalline melt point (when crystallized); better chemical resistance; higher tensile strength at break; greater elongation at break; and greater impact strength. PCT-based films are useful at service temperatures well in excess of the highest service temperatures at which PET films and DMD laminates can function. Furthermore, PCT-based insulation films cannot de-laminate as can the DMD insulation. In summary, PCT-based electrical insulation films provide improved performance over a broader range of operating service temperatures encountered by electric motors, generators, transformers, and other electromagnetic induction equipment, as compared to electrical insulating materials which are presently used in such equipment. PCT films or non-woven mats also have excellent hydrolytic stability which allows it to be used in oil filled transformers as an insulation.

A non-woven fiber mat formed from spun or cast PCT filaments or fibers will also possess all of the aforesaid essential advantages possessed by the PCT film. The mat form of the insulation can be formed by melt blowing, or otherwise entangling the PCT fibers, so as to form a cohesive sheet of non-woven PCT fibers. The aforesaid sheets can be calendered for use in certain applications.

The film or mat form of the PCT insulation can be used alone in applications having service temperatures up to about 155° C. Higher service temperature applications can be handled by a laminate of PCT and aramid; PES; PPS; PI; PEI; PEN; PS; and PEEK.

It is therefore an object of this invention to provide an electrical insulation material in combination with electromagnetic induction electrical equipment operating over a broad range of service temperatures up to at least 155° C.

It is an additional object of this invention to provide an electrical insulation material-electrical equipment combination-electrical equipment combination of the character described which can perform at relatively high service temperatures.

It is a further object of this invention to provide an electrical insulation material-electrical equipment combination, which insulation material cannot de-laminate in service.

It is another object of this invention to provide an electrical insulation material which possesses greater toughness than commonly used electrical insulation materials.

It is yet another object of this invention to provide an electrical insulation material that can be used in tape form, sheet form, or die-cut forms to insulate electrical conductors, electrical motor slots, or other electrical components used in electromagnetic induction equipment.

These and other objects and advantages of the invention will become more readily apparent from the following detailed description of several embodiments of the invention when taken in conjunction with the accompanying drawings, in which:

BEST MODE FOR CARRYING OUT THE INVENTION

Figure 1:
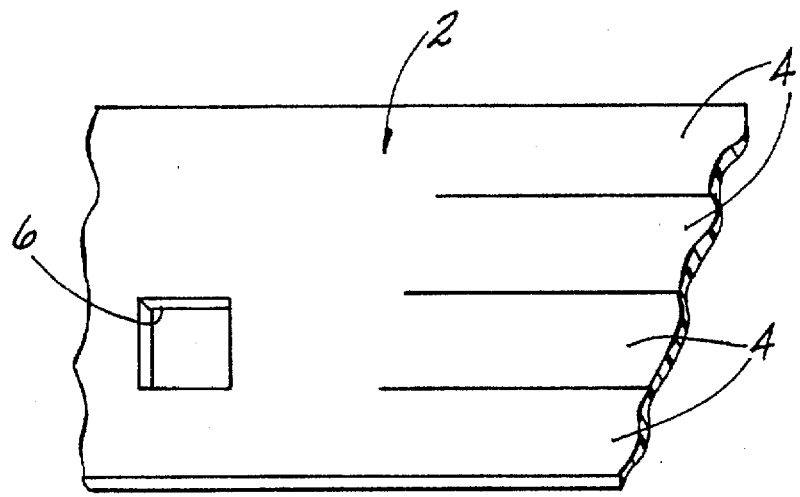
FIG. 1 is a fragmented perspective view of a stock sheet of the insulation material of this invention cut into conductor wire insulating tapes.

Referring now to FIG. 1, there is shown a fragment of a stock sheet of insulation material formed in accordance with this invention, the sheet being denoted generally by the numeral 2. The preferred material is a copolymer consisting essentially of cyclohexylene dimethylene terephthalate, either in film form or in mat form, with about 5% to about 30% of an isophthalate acid comonomer taking the place of the terphthalic acid comonomer. The insulation material may have a thickness in the range of about 0.001 to about 0.030 inch. The stock sheets 2 of the film may be formed by extrusion in the case of a film, or by extruding and casting of PCT fibers in the case of a mat. The stock sheets 2 may be slit into elongated tapes 4 for a width suitable for use in wrapping electrical conductor wires. When the sheets 2 are formed for producing wire insulation tapes, the thickness of the sheets will be in the range of about 0.001 to about 0.005 inch thick. The sheets 2 may also be die cut as indicated by the numeral 6 in FIG. 1, to form slot liners for use in insulating the slots in an electric motor.

Figure 2:
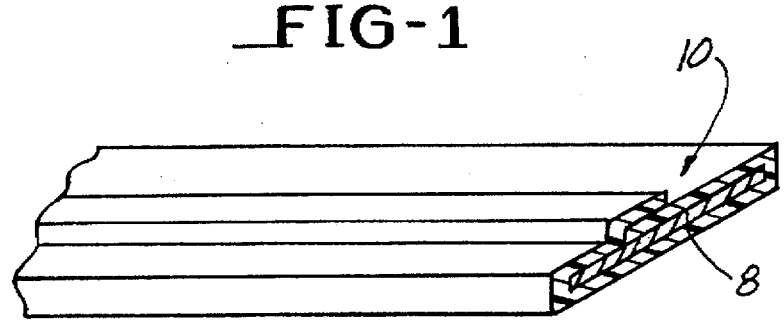
FIG. 2 is a fragmented perspective view of an electrical conductor wire having the insulation material of this invention linearly wrapped thereon.
Figure 3:
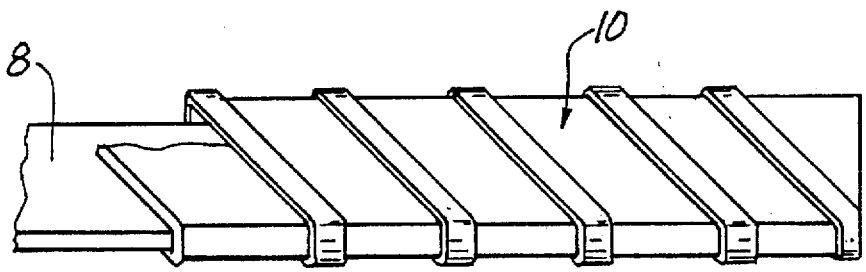
FIG. 3 is a view similar to FIG. 2, but showing an electrical conductor wire having the insulation material of this invention spirally wrapped thereon.

Referring to FIGS. 2 and 3, there are shown electrical conductor wires 8 which have a layer of the insulation material 10 of this invention applied thereto. The insulation material 10 may be applied to the conductor wire 8 by linear wrapping, as shown in FIG. 2, or by spiral wrapping, as shown in FIG. 3. Adhesives which are coated on the film; or a heat seal layer which is coextruded onto the film; or mere tension may be used to affix the insulation 10 to the the wire 8. As noted above, the insulation 10 will be typically in the range of 0.001 to 0.005 inch thick when used to insulate an electrical conductor wire 8. Insulated conductor wires of the type shown and described in U.S. Pat. No. 5,254,806, granted Oct. 19, 1993 to Gross et al can also be formed with the insulation materials described herein above.

Figure 4:
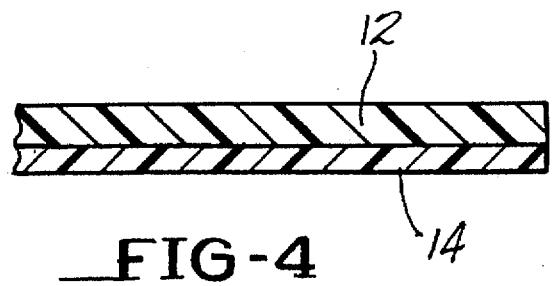
FIG. 4 is a sectional view of a laminated insulation sheet which includes at least one layer of PCT insulation material as a component thereof.

Referring to FIG. 4, there is shown an insulation material which takes the form of a laminate having a PCT layer 12 and another PCT or non-PCT material layer 14. The material layer 14 could be formed from aramid; PES; PPS; PI; PEI; PEN; PS; and PEEK. Such laminates can be used for higher temperature applications as conductor wire wrapping, slot liners, or for numerous other insulation applications, such as slot or phase insulation for motors used in high temperature or high performance applications, tape in DC motor armature coils, layer or ground insulation in 180° C. dry-type transformers, for example. The layer 14 could also be a coextruded layer of a heat seal material such as PETG which would provide improved adhesion of the PCT film to a conductor wire or slot liner.

Figure 6:
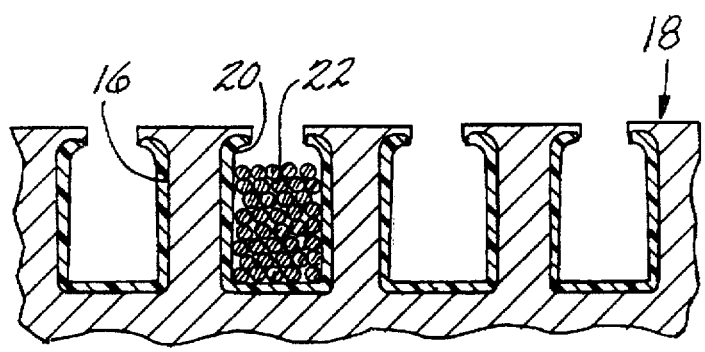
FIG. 6 is a fragmented sectional view of a portion of the motor stator showing how the slot liners are placed in the stator slots.
Figure 5:
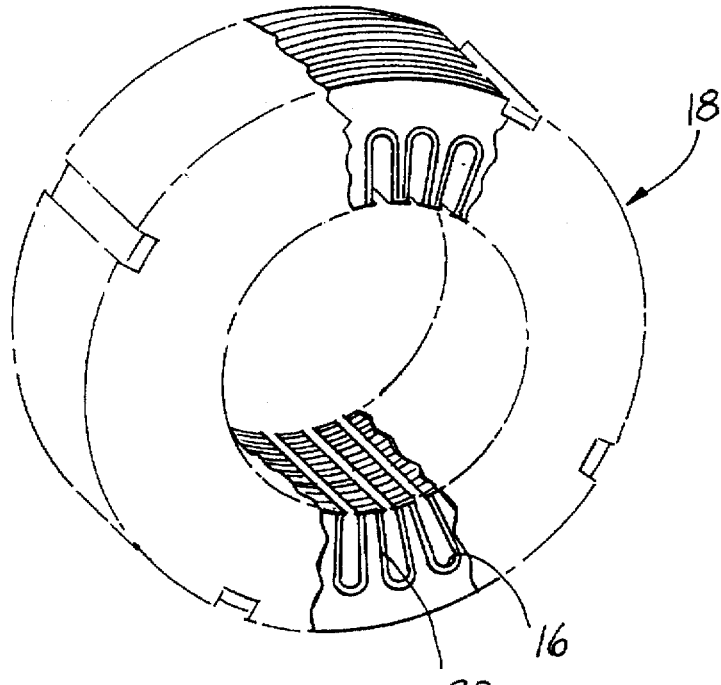
FIG. 5 is a sectional view of an electric motor stator showing the motor slots which are insulated by slot liner insulators formed in accordance with this invention.

Referring to FIGS. 5 and 6, there is shown the manner in which the slots 16 in a motor stator 18 are insulated by slot liners 20 formed in accordance with this invention. Each of the slots 16 contains one or more motor windings 22 which are electrically insulated from the motor slots by an insulating slot liner 20 which may be formed from a PCT polymer film or mat. The slot liner 20 is preferably a homogeneous PCT polymer layer having a thickness in the range of about 0.005 to about 0.030 inch. The coil conductor windings 22 may also be insulated with a PCT insulation tape of appropriate thickness.

Figure 7:
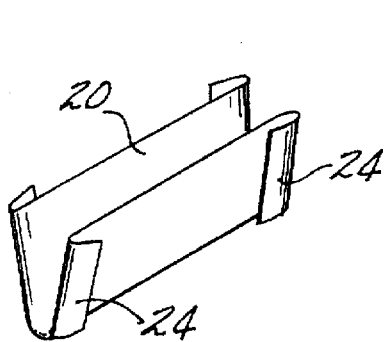
FIG. 7 is a perspective view of one configuration of a slot liner used to insulate electric motor stator slots.

FIG. 7 shows one configuration that the slot liners 20 can assume. The slot liners 20 can be formed with turned-back cuffs 24 at each end thereof. The cuffs 24 prevent the slot liners 20 from accidentally sliding out through the ends of the motor slots 16.

Figure 8:
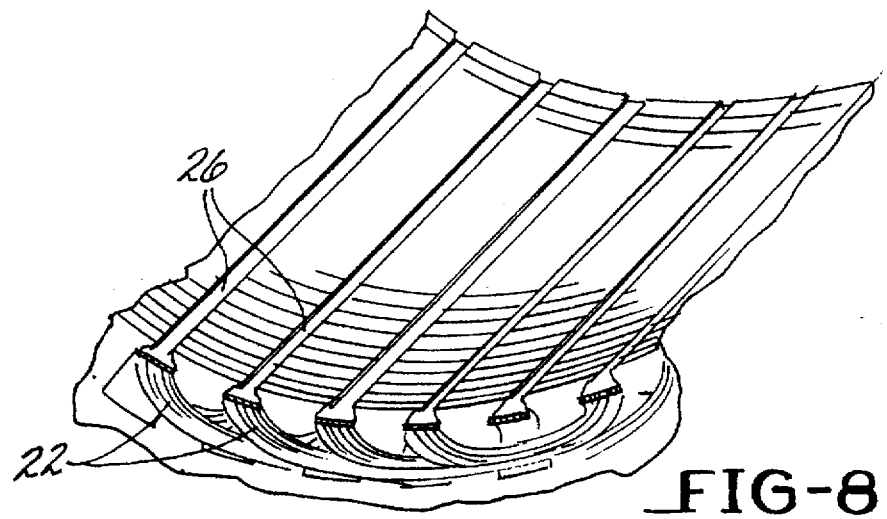
FIG. 8 is a fragmented perspective view of an electric motor stator showing slot wedges formed in accordance with the invention.

FIG. 8 shows the use of slot wedges 26 positioned in the slot mouths so as to cover the conductor wires 22 in the slots 16.

A preferred PCT electrical insulation polymer film for use in this invention is a 1, 4-cyclohexylene dimethylene terephthalate copolymer commercially produced by Eastman Chemicals and sold under the trademark "Kodar". This is a 5% isophthalic acid-modified copolymer of the cyclohexylene dimethylene terephthalate polymer. Various other acid-modified variations of this polymer are available, and may also be used in practicing this invention. In acid-modified copolymers, which are known as PCTA, between 5% and 30% of the terephthalic acid molecules can be replaced by isophthalic acid molecules in order to modify processing and crystallinity characteristics of those polymers.

As used in this specification, the term "PCT" refers to both cyclohexylene dimethylene terephthalate polymers, and copolymers thereof, such as, but not limited to, PCTA.

The thickness of the film can vary from 0.001 to 0.030 inch, depending on what electrical components are being insulated. The stock sheets of the PCT insulation film will preferably be produced in the amorphous state, and will be applied to the components to be insulated in the amorphous state. The film, once placed in position, can be crystallized by controlled heat tempering in order to consolidate, thereby providing for increased rigidity, hardness, and increased thermal stability, tensile strength and flexural modulus of elasticity. Alternatively, the PCT film could be uniaxially or biaxially oriented to crystallize it prior to its being applied to the conductor.

The PCT insulation materials of this invention can be used as the sole insulation in certain electrical equipment applications, or can be used as a component of an electrical insulating laminate which laminate could include additional components, such as: aramid; PES; PPS; PI; PEI; PEN; PS; PEEK; PET; and rag paper, the organic materials being useful in either film or non-woven forms. These additional components could be used to increase the thermal stability of the insulation, and could be used to reduce the cost of the PCT insulation where thicker layers are desired. PCT electrical insulation materials, and products including PCT electrical insulation materials, are particularly useful in electrically powered rotating apparatus, transformers, and other devices which utilize the principles of magnetically induced voltage.

Since many changes and variations of the disclosed embodiments of the invention may be made without departing from the inventive concept, it is not intended to limit the invention otherwise than as required by the appended claims.

What is claimed is:

1. An electrical component for use in an electromagnetic induction device, said component comprising, in combination:

a) an electrical conductor wire: and b) an insulation layer consisting of a non-woven fiber mat formed from cyclohexylene dimethylene terephthalate polymer (PCT) fibers, said insulation layer being wrapped onto the conductor wire to electrically insulate said conductor wire.

2. The component of claim 1 wherein said PCT fiber mat is substantially amorphous.

3. The component of claim 2 wherein said insulation layer is spiral wrapped on said conductor wire.

4. The component of claim 2 wherein said insulation layer is linear wrapped on said conductor wire.

5. The component of claim 1 wherein said PCT fiber mat is substantially crystallized.

6. The component of claim 5 wherein said insulation layer is spiral wrapped on said conductor wire.

7. The component of claim 5 wherein said insulation layer is linear wrapped on said conductor wire.

* * * * *